United States Patent Office 3,634,534
Patented Jan. 11, 1972

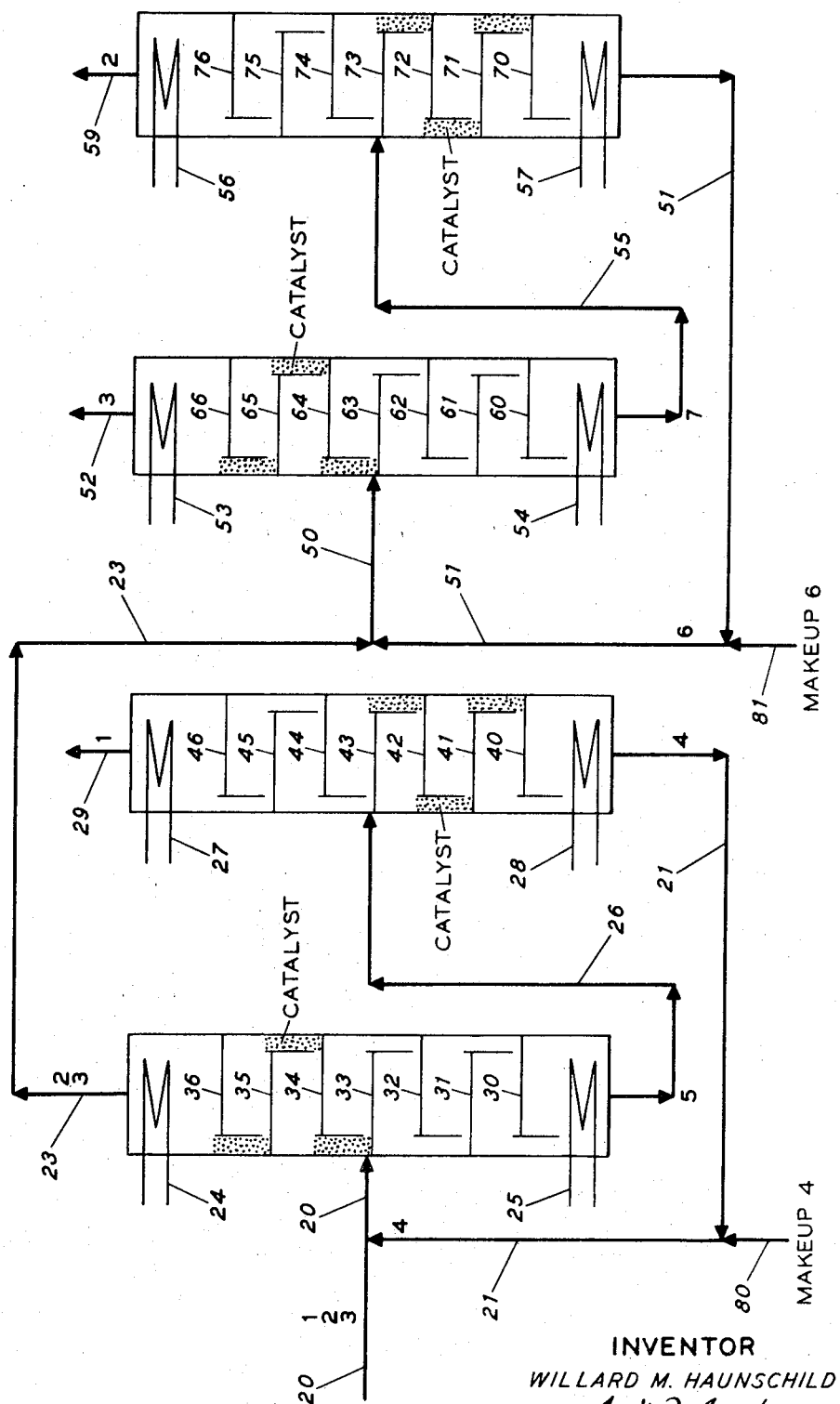

3,634,534
SEPARATION OF CHEMICALS USING FRACTIONATION AND HETEROGENEOUS CATALYSIS
Willard M. Haunschild, Walnut Creek, Calif., assignor to Chevron Research Company, San Francisco, Calif.
Filed Aug. 22, 1969, Ser. No. 852,225
Int. Cl. C07c 11/12
U.S. Cl. 260—677 A                                 4 Claims

ABSTRACT OF THE DISCLOSURE

The disclosure relates to an invented process which may be used, for example, to separate components of a mixture of closely boiling hydrocarbons such as a mixture of tertiary pentenes, linear olefins, isopentane, and normal pentane. According to the disclosure, such a mixture is fed to a first distillation column reactor wherein the tertiary olefin is reacted with an alcohol so that the linear olefins and paraffins may be readily fractionated overhead. A mixed stream of ethers is removed from the bottom of the first distillation column reactor and is fed to second distillation column reactor wherein the ether is decomposed so that the tertiary pentenes may be readily fractionated overhead. Most of the alcohol is removed from the lower part of the second distillation column reactor and recycled back to the first distillation column reactor. The linear pentenes and the pentanes removed from the upper part of the first distillation column reactor are fed to a third distillation column reactor wherein the linear pentenes are reacted with an organic acid so that the pentanes may be readily distilled overhead and the ester resulting from the reaction fractionated downwardly. The esters are removed from the lower part of the second distillation column reactor and are fed to fourth distillation column reactor wherein they are decomposed and the resulting linear pentenes are fractionated away from the organic acid. Linear pentenes are removed from the fourth distillation column reactor, and a separate stream rich in the organic acid is removed from the fourth distillation column reactor (and recycled as feed back to the third distillation column reactor).

CROSS REFERENCES

This application is related to my applications titled "Distillation of Volatile Reactants and Heterogeneous Catalysis," Ser. No. 852,269, "Separation and Catalysis," Ser. No. 852,270, and "Separation of Linear Olefins from Tertiary Olefins," Ser. No. 852,227, filed on or about Aug. 22, 1969 which applications are incorporated by reference in their entirety into the present patent application.

BACKGROUND OF THE INVENTION

Field of the invention

The present invention relates to separation of a mixture of chemicals using a plurality of fractionation columns. Still more particularly, the present invention relates to the separation of a mixture of chemicals using fractionation and simultaneous chemical reactions carried out in a plurality of distillation columns.

Prior art

Much of the pertinent prior art is discussed in my related applications referred to above.

Distillation and simultaneous reaction is disclosed in U.S. Pat. 2,839,588. However, in U.S. Pat. 2,839,588 the distillation is aimed at removing certain chemical constituents so that undesirable side reactions do not decrease the yield of the desired chemical.

U.S. Pat. 3,170,000 and U.S. Pat. 3,121,124 disclose methods for separating tertiary pentenes from other hydrocarbons. However, they do not disclose a method for separating a relatively pure stream of linear pentenes from a mixture of linear pentenes, tertiary pentenes and paraffins. In a typical $C_5$ refinery stream the following components (which boil at the listed temperature) are present:

| Hydrocarbon | | Boiling point, °C. |
|---|---|---|
| Linear pentenes | Cis-pentene-2 | 36.3 |
| | Trans-pentene-2 | 36.9 |
| | Pentene-1 | 30.0 |
| Tertiary pentenes | 2-methyl-butene-1 | 31.2 |
| | 2-methyl-butene-2 | 38.6 |
| Pentanes | Isopentane | 27.9 |
| | Pentane | 36.1 |

It is apparent from the above table that it is difficult to separate tertiary pentenes from linear pentenes by distillation. The process disclosed in both U.S. Pat. Nos. 3,170,000 and 3,121,124 accomplishes the separation by first forming ether from the tertiary pentene by reacting the ether with alcohol and then separating the ether, and finally decomposing the ether to obtain the tertiary pentenes and alcohol. The alcohol is washed out of the tertiary pentene stream, using water. Along with other impurities, the resulting linear pentenes have pentanes mixed with them. As can be seen from the boiling points tabulated above, the linear pentenes -2, cis- and trans-, are difficult to separate from the pentanes by fractionation. In addition to the separation difficulty because of the close proximity of the boiling points, it can be seen that 2-methyl-butene-1 boiling at 31.2° C. boils between pentene-1 (30° C.) and the cis- and trans-pentene-2's (36.3 and 36.9° C.).

Thus, in previously proposed processes a very large number of trays were needed to obtain good fractionation of the pentene-2's from the mixture of hydrocarbons. Furthermore, the desired linear pentene-1 was generally sacrificed because its boiling point is slightly below the boiling point of the tertiary olefin 2-methyl-butene-1.

My application titled "Separation of Linear Olefins from Tertiary Olefins," filed on or about Aug. 22, 1969 is directed to a process to separate, for example, linear pentenes from tertiary pentenes. However, in that process, using one distillation column reactor, the stream of pentenes which is obtained contains normal pentane which, as can be seen from the table above, boils very close to the cis- and trans-pentene-2's. According to the process of the present invention, the normal pentane is readily separated from all of the linear pentenes.

SUMMARY OF THE INVENTION

According to the present invention a process is provided for separating a first chemical and a second chemical as separate streams from a third chemical, wherein the first chemical reacts reversibly with a fourth chemical and the second chemical reacts reversibly with a sixth chemical, which process comprises:

(a) Feeding the mixture of the first, second, and third chemicals to a feed zone of a first distillation column reactor;

(b) Reacting the first chemical with said fourth chemical in the first distillation column reactor to form a fifth chemical;

(c) Distilling the second and third chemical upwardly in the first distillation column reactor, removing the second and third chemicals from an upper part of the first distillation column reactor, and removing the fifth chemical from a lower part of the first distillation column reactor;

(d) Feeding the fifth chemical, removed from the first distillation column reactor, to a feed zone of a second distillation column reactor, and decomposing the fifth chemical in the second distillation column reactor to obtain the first chemical and said fourth chemical;

(e) Distilling the first chemical upwardly in the second distillation column reactor and withdrawing the first chemical from an upper part of the second distillation column reactor;

(f) Feeding the second and third chemical, removed from the upper part of the first distillation column reactor, to a feed zone of the third distillation column reactor, and also feeding said sixth chemical to the third distillation column reactor;

(g) Reacting said sixth chemical with the second chemical in the third distillation column reactor to form a seventh chemical;

(h) Fractionating the seventh chemical downwardly from the other chemicals in the third distillation column reactor and removing the seventh chemical from a lower part of the third distillation column reactor;

(i) Feeding the seventh chemical, removed from the third distillation column reactor, to a feed zone of a fourth distillation column reactor;

(j) Decomposing the seventh chemical in the fourth distillation column reactor to obtain said sixth and second chemicals; and (k) Fractionating the second chemical from the sixth chemical in the fourth distillation column reactor and withdrawing the second chemical from the fourth distillation column reactor.

The reactions in the various distillation column reactors may be catalyzed by either homogeneous or heterogeneous catalysts, or they may be uncatalyzed reactions. However, as discussed in more detail in my earlier patent applications referred to previously, in certain instances it is preferable to use heterogeneous catalysts preferably located in a plurality of zones in one or more of their respective distillation column reactors. For example, heterogeneous catalysts may be used in all four of the distillation column reactors. Thus, in a preferred embodiment of the present invention heterogeneous catalysts effective to accelerate the rate of the desired combination and decomposition reactions carried out in the respective distillation column reactors are located in a plurality of zones primarily above the feed zone in the first distillation column reactor, below the feed zone in the second distillation column reactor, above the feed zone in the third distillation column reactor, and below the feed zone in the fourth distillation column reactor.

The process of the present invention is advantageously applied to the separation of linear olefins (and in general nontertiary olefins) from tertiary olefins. For example, the process of the present invention is suitable for obtaining a relatively pure stream of linear pentenes from a refinery $C_5$ stream composed largely of n-pentane, isopentane, pentene-1, cis-pentene-2, trans-pentene-2, 2-methyl-2-butene, and 2-methyl-1-butene. (For purposes of this specification, linear pentenes are pentenes having no branched chain carbon atoms. Tertiary pentenes or tertiary olefins contain a tertiary carbon atom, that is, a carbon atom bonded to three other carbon atoms and connected to one of these carbon atoms by a double bond as, for example, 2-methyl-2-butene.) Thus, according to the present invention, a process is provided for separating linear pentenes and tertiary pentenes as separate streams from a mixture of chemicals comprised of the linear pentenes, tertiary pentenes, and iso- and normal pentanes, which process comprises:

(a) Feeding the mixture to a feed zone of a first distillation column reactor;

(b) Reacting the tertiary pentene with an alcohol in the first distillation column reactor to form an ether;

(c) Distilling the linear pentenes and the iso- and normal pentane upwardly in the first distillation column reactor, removing the linear pentenes and the iso- and normal pentane from an upper part of the first distillation column reactor, and removing the ether from a lower part of the first distillation column reactor;

(d) Feeding the ether, removed from the first distillation column reactor to a feed zone of the second distillation column reactor, and decomposing the ether in the second distillation column reactor to obtain the tertiary pentenes and said alcohol;

(e) Distilling the tertiary pentenes upwardly in the second distillation column reactor and withdrawing the tertiary pentenes from an upper part of the second distillation column reactor;

(f) Feeding the linear pentenes and the iso- and normal pentane, removed from the upper part of the first distillation column reactor, to a feed zone of the third distillation column reactor, and also feeding an organic acid to the third distillation column reactor;

(g) Reacting said organic acid with the linear pentenes in the third distillation column reactor to form an ester;

(h) Fractionating the ester downwardly from the iso- and normal pentane in the third distillation column reactor and removing the ester from a lower part of the third distillation column reactor;

(i) Feeding the ester, removed from the third distillation column reactor, to a feed zone of a fourth distillation column reactor;

(j) Decomposing the ester in the fourth distillation column reactor to obtain said organic acid and the linear pentenes; and (k) Fractionating the linear pentenes from the organic acid in the fourth distillation column reactor and withdrawing the linear pentenes from a fourth distillation column reactor.

In the just-mentioned process it is preferable to recycle alcohol withdrawn from the second distillation column reactor as feed back to the first distillation column reactor. It is also preferable to recycle organic acid withdrawn from the fourth distillation column reactor back to the third distillation column reactor.

As is well known in the fractionation art, the ease with which chemical substances are fractionated from one another depends primarily on their relative volatilities. Relative volatility is in turn directly and intimately related to the boiling point of the respective chemicals. Thus, the linear pentenes cannot be readily fractionated from 2-methyl-butene-1 or 2-methyl-butene-2 because of the relative volatility is approximately 1; the boiling points of the linear pentenes and the tertiary pentenes are very close to one another. However when the tertiary pentene is reacted with an alcohol, such as methanol, to form methyl-t-amyl ether, the linear pentene may be readily fractionated from the methyl-t-amyl ether because the linear pentene is more volatile than the heavier ether. Thus, in the process of the present invention the linear pentene, as well as the pentanes, are distilled upward in the first distillation column reactor, whereas the ethers are fractionated downwardly. The ethers are removed from the lower part of the distillation column reactor and fed to the second distillation column reactor wherein they are decomposed to form the original tertiary pentene and methanol. Because the ether is relatively less volatile and has a higher boiling point, it will tend to be fractionated downwardly in the second distillation column. Therefore, the concentration of the ether will be greater in the lower part of the second distillation column than it is above the zone at which the ether is fed to the second distillation column. Thus, it is preferred to have the catalyst located in the lower part of the second distillation column so that it may accelerate the decomposition of the ether at those zones in the distillation column where the concentration of ether is the highest.

In the second distillation column the relative volatilities of the tertiary pentenes to the alcohol is important. It is preferred to use alcohol which has a relatively large difference in boiling point as compared to the tertiary pentene. Thus, stated in general terms, it is preferable to choose as the alcohol reactant (fourth chemical) an alcohol which will be easily fractionated from the tertiary pentenes (first chemical) in the second distillation column. Thus, an alcohol such as butanol boiling at 117° C. is generally preferred over a lower boiling alcohol such as methanol boiling at 64.7° C. when the process of the present invention is used to separate out a stream of tertiary pentenes boiling at about 20 to 39° C. in the second distillation column. In general, the choice of alcohol depends on optimum balance of: (1) relative volatility of ether and olefins, (2) reaction rate, and (3) presence or absence of azeotropes.

Similar considerations prevail with respect to the third and fourth distillation column reactors. When reacting the linear pentenes fed to the third distillation column reactor with an organic acid, the organic acid will be withdrawn from the lower part of the fourth distillation column reactor. The lowest boiling organic acid is formic acid boiling at 100.7° C. versus a boiling point of 30 to 37° C. for the linear pentenes. In general, the choice of the sixth chemical which reacts reversibly with the second chemical in the third distillation column reactor should be made so that when the reaction is reversed in the fourth distillation column reactor, the sixth and second chemicals can be fractionated apart from one another relatively easily. In some instances the second chemical will be fractionated upwardly, and the sixth chemical downwardly, but in certain instances the reverse will prevail because the chosen sixth chemical is more volatile than the second chemical.

BRIEF DESCRIPTION OF THE DRAWING

The drawing schematically illustrates a preferred process flow scheme as contemplated by the inventor for the practice of the present invention.

DETAILED DESCRIPTION

Referring now in more detail to the drawing, a mixture of chemicals, which for purposes of description are indicated as hypothetical chemicals 1, 2 and 3, are introduced to the process via line 20. The process of the present invention may be applied to a wide variety of chemical mixtures. A limitation, however, on the process of the present invention is that the specified reactions carried out in the first and third distillation reactors be reversible reactions. Thus, in the present hypothetical description the specified reaction for distillation reactor 1 is 1+4→5; the specified reaction for distillation reactor 3 is 2+6→7. These respective reactions are reversed in the second and fourth distillation column reactors, respectively.

Thus, in order to carry out the process of the present invention, it is necessary to restrict the chemicals to those which are amenable to reversible reactions. For practical purposes essentially all reversible reactions are equilibrium-limited, that is, limited in the amount of product that can be formed under a given set of temperature and pressure conditions for a given amount of reactants. The reaction becomes equilibrium-limited when the forward reaction rate is equaled by the rate of the reverse reaction. In those instances where the equilibrium limitation restricts the yield to substantially below 90% conversion to product as, for example, 50 to 75% conversion to product, it is particularly advantages to employ distillation column reactors as discussed in my patent applications referred to previously.

Referring again more specifically to the drawing, the mixture of chemicals 1, 2 and 3 are introduced to the first distillation column reactor together with chemical 4. In the first distillation column reactor chemical 4 reacts with chemical 1 to form chemical 5. In virtually all instances chemical 5 will be heavier, that is, higher boiling, than chemicals 1 and 4; therefore, chemical 5 will tend to fractionate downwardly according to well-established fractionation principles, and chemicals 1 and 4 will tend to fractionate upwardly in the first distillation column reactor. Preferably, chemical 4 is chosen so that a stream rich in chemicals 2 and 3 will be considerably more volatile than chemical 5, and thus chemicals 2 and 3 will be relatively easily fractionated upwardly away from chemical 5. In the drawing chemicals 2 and 3 are shown as being withdrawn from the top of the distillation column via line 23.

Countercurrent vapor and liquid flow are established in the first distillation column reactor by removing heat from the upper part of the column by means of cooling coil 24 so as to generate downward-flowing liquid, and adding heat to the lower part of the column by means of heating coil 25 so as to generate upward-flowing vapors. Other means may be used to accomplish these ends as, for example, an overhead condensing system with reflux to the upper part of the column and an external reboiling system at the lower part of the column to add heat and generate upward-flowing vapors.

Because chemicals 1 and 4 are more volatile than chemical 5, the concentration of chemicals 1 and 4 will be greatest in the upper part of the column. Thus, the catalyst is most advantageously located above the feed plate 33. The catalyst is located in the downcomers from the various trays above the feed tray according to the preferred embodiment schematically illustrated by the drawing.

Chemical 5 formed in the first distillation column reactor is withdrawn via line 26 from the lower part of the distillation column reactor and is fed to the second distillation column reactor for decomposition. Chemical 5 is decomposed in the second distillation column reactor according to the reaction 5→1+4. The relatively heavy and less volatile chemical 5 is fractionated downwardly in the second distillation column reactor and therefore is most concentrated below feed plate 43. Therefore, it is preferred to locate the catalyst primarily below the feed plate in the second distillation column reactor. In the drawing the catalyst is again shown schematically as being located in the downcomers from trays 43, 42 and 41.

Preferably, sufficient reaction conditions are attained, that is, temperature, pressure, type of catalyst, volume of catalyst, contacting efficiency, etc. so that all of chemical 5 will be decomposed before reaching the bottom of the second distillation column reactor. When the conditions established are sufficient to attain complete decomposition of chemical 5 to chemicals 1 and 4, then there is no impurity of chemical 5 in the recycle of chemical 4 from the bottom of the second distillation column reactor to the first distillation column reactor. However, for the schematic process flow shown in the drawing, it is not critical that there be no chemical 5 impurity in the recycle stream of chemical 4, because chemical 5 will merely be fractionated downwardly in the first distillation column reactor.

However, the same is not true with respect to the stream of chemicals 2 and 3 withdrawn via line 23 from the top of the first distillation column reactor. Those chemicals which are fed to the third distillation column reactor do not find their way back to either the first or second distillation column reactor via any recycle line. Therefore, any impurity in the stream of chemicals 2 and 3 will be likely to contaminate the product chemicals 2 and 3 withdrawn respectively from the fourth and third distillation column reactors. Thus, it is more important that the reaction conditions established in the first distillation column reactor be sufficient so that all of chemicals 1 and 4 are consumed before reaching the top of the first distillation column reactor. Thus, the amount of chemical 4 recycled via line 21 is preferably a stoichiometric amount for combination with chemical 1 to form chemical 5, and sufficient contact time with the catalyst is provided and other reaction conditions provided so that all of chemicals 1 and 4 feed to the first distillation column reactor to form chemical 5. One alternative that is, however, available in the preferred scheme illustrated in the drawing is to use an excess over the stoichiometric amount of chemical 4 required for the reaction 1 + 4 → 5, and then fractionate the excess of chemical 4 downwardly in the first distillation column reactor so that it may be withdrawn together with chemical 5 via line 26. Chemical 4 is then recovered from the bottom of the second distillation column reactor for recycle back to the first distillation column reactor, and the stream of chemicals 2 and 3 which is sent to the third distillation column reactor does not contain any substantial chemical 1 or 4 impurity. In the specific embodiment of the present invention wherein chemical 4 is an alcohol and the reaction carried out in the first distillation column reactor is the formation of a tertiary ether by reaction of the alcohol with a tertiary olefin, it is preferred to use an excess of the alcohol. For example, where methanol is the alcohol, the excess methanol drives the reaction of the tertiary olefin to form tertiary ether essentially to completion. Also, the excess methanol maintains the ion-exchange catalyst in methanol saturated condition to thereby effectively inhibit side reactions.

The second distillation column reactor has a cooling coil 27 and a heating coil 28 which function similarly to the cooling and heating coils in the first distillation column reactor. Chemical 1, which is fractionated upwardly, is withdrawn from the top of the second distillation column reactor via line 1. Although in this description the various streams are referred to as chemical 1, chemicals 2 and 3, chemical 4, etc., it is to be understood that these streams are streams rich in the specified chemical, but not necessarily 100% pure. Thus, stream 29 withdrawn from the top of the second distillation column reactor is rich in chemical 1 containing, for example, 90% or more of chemical 1, but the reference to stream 29 as a chemical 1 stream does not connote that it is 100% pure in chemical 1.

The stream of chemicals 2 and 3 withdrawn from the top of the first distillation column reactor is passed via line 23 and then line 50 to the third distillation column reactor. Chemical 6 is fed to the third distillation column reactor via lines 51 and 50. In the third distillation column reactor chemicals 2 and 6 react to form chemical 7. Operation in the third distillation column reactor is similar to the operation in the first distillation column reactor. Chemical 7 is fractionated downwardly, and chemical 3 is fractionated upwardly. As indicated, the catalyst is located above feed tray 63 so as to accelerate the reaction of chemical 2 with chemical 6 by contact with these chemicals at the points in the distillation column where the concentration of these chemicals is the highest. Because it is desired to withdraw a stream of relatively pure chemical 3 from the top of the third distillation column reactor, sufficient reaction conditions should be established so that essentially all of chemicals 2 and 6 react to form chemical 7, and thus are not present as an impurity in the overhead stream of chemical 3. Similar to the previous discussion with respect to chemical 4 in the first distillation column reactor, there may be an excess of chemical 2 or 6 in the feed to the third distillation column reactor which does not end up as an impurity in stream 52 of chemical 3, if the conditions maintained in the third distillation column as, for example, the amount of downward-flowing reflux are such and the relative volatility of 2 and 6 with respect to 3 is such that any excess of chemical 2 and 6 is withdrawn from the bottom of the third distillation column reactor. Cooling coil 53 is provided in the upper part of the third distillation column reactor, and heating coil 54 is provided in the lower part of the distillation column reactor. Chemical 7 is withdrawn via line 55 from the bottom of the third distillation column reactor.

Chemical 7 is fed via line 55 to tray 73 of the fourth distillation column reactor. In the fourth distillation column reactor chemical 7 is decomposed in accordance with the reaction 7 → 2 + 6. As indicated, the catalyst is located primarily below feed tray 73 because the concentration of chemical 7 is greatest below feed tray 73 as opposed to above feed tray 73. Thus, the catalyst which accelerates decomposition reaction is located where it can most effectively accomplish the purpose of speeding up the formation of chemicals 2 and 6. Very little catalyst, if any, is located above feed tray 73. Thus, there is essentially no catalyst positioned where the concentration of chemicals 2 and 6 is relatively high. Therefore, the reaction 2 + 6 → 7 is minimized in the fourth distillation column reactor because essentially no catalyst is positioned in those places where it would be most effective to accelerate the formation of 7 by the combination of 6 and 2. This principle is applied in a similar manner to the other three distillation columns in the preferred embodiment illustrated so that the catalyst is located above the feed zone in those distillation column reactors where a combination reaction is to be promoted, and the catalyst is located below the feed zone where a decomposition reaction is to be promoted.

Downward-flowing liquid, which may be referred to as internal reflux, is generated in the fourth distillation column reactor by cooling coil 56 which removes heat from the upper part of the distillation column. Upward-flowing vapors are generated in the lower part of the column by heating coil 57 to thus put the column in heat balance and establish countercurrent liquid vapor flow so as to effect fractionation in the fourth distillation column reactor. Chemical 2 is withdrawn from the top of the fourth distillation column reactor via line 59, and the less volatile chemical 6 is withdrawn from the bottom of the fourth distillation column reactor via line 51.

Both chemicals 6 and 4 are recycled with no net consumption. However, there may be some loss of chemical 4 in the chemical 1 product stream and some loss of chemical 6 in the chemical 2 and the chemical 3 product streams. Thus, makeup of chemical 4, as well as the initial supply of chemical 4, is introduced via line 80 as shown in the schematic process flow diagram. Similarly, a makeup of chemical 6 is introduced via line 81.

One example of chemicals 1 through 7 is as follows: 1: tertiary pentene; 2: linear pentene; 3: normal pentane; 4: methanol; 5: methyl-t-amyl ether; 6: formic acid; and 7: amyl formate.

Although various specific embodiments of the invention have been described and shown, it is to be understood they are meant to be illustrative only and not limiting. Certain features may be changed without departing from the spirit or essence of the invention. It is apparent that the present invention has broad application to the separation of a mixture of three or more chemicals wherein at least two of the chemicals in the mixture can be reacted reversibly with one or more other chemicals.

Accordingly, the invention is not to be construed as limited to the specific embodiments illustrated but only as defined in the appended claims.

What is claimed is:

1. A process for separating a tertiary olefin and a linear olefin as separate streams from a paraffin, wherein the tertiary olefin reacts reversibly in an equilibrium-limited reaction with an alcohol and the linear olefin reacts reversibly in an equilibrium-limited reaction with an organic acid, which process comprises:

(a) feeding the mixture of the tertiary olefin, linear olefin, and paraffin to a feed zone of a first distillation column reactor;

(b) reacting the tertiary olefin with said alcohol in the first distillation column reactor to form an ether;

(c) distilling the linear olefin and paraffin upwardly in the first distillation column reactor, removing the linear olefin and paraffin from an upper part of the first distillation column reactor, and removing the ether from a lower part of the first distillation column reactor;

(d) feeding the ether, removed from the first distillation column reactor to a feed zone of a second distillation column reactor, and decomposing the ether in the second distillation column reactor to obtain the tertiary olefin and said alcohol;

(e) distilling the tertiary olefin upwardly in the second distillation column reactor and withdrawing the tertiary olefin from an upper part of the second distillation column reactor;

(f) feeding the linear olefin and paraffin, removed from the upper part of the first distillation column reactor, to a feed zone of a third distillation column reactor, and also feeding said organic acid to the third distillation column reactor:

(g) reacting said organic acid with the linear olefin in the third distillation column reactor to form an ester;

(h) fractionating the ester downwardly from the other chemicals in the third distillation column reactor and removing the ester from a lower part of the third distillation column reactor;

(i) feeding the ester, removed from the third distillation column reactor, to a feed zone of a fourth distillation column reactor;

(j) decomposing the ester in the fourth distillation column reactor to obtain said organic acid and linear olefins; and (k) fractionating the linear olefin from the organic acid in the fourth distillation column reactor and withdrawing the linear olefin from the fourth distillation column reactor.

2. A process in accordance with claim 1 wherein heterogeneous catalysts effective to accelerate the rate of the respective combination equilibrium-limited and decomposition equilibrium limited reactions in claim 1 are located in a plurality of zones above the feed zone in the first distillation column reactor, below the feed zone in the second distillation column reactor, above the feed zone in the third distillation column reactor, and below the feed zone in the fourth distillation column reactor.

3. A process for separating linear pentenes and tertiary pentenes as separate streams from a mixture of linear pentenes, tertiary pentenes, and iso- and normal pentane, which process comprises:

(a) feeding the mixture to a feed zone of a first distillation column reactor;

(b) reacting the tertiary pentene with an alcohol in the first distillation column reactor to form an ether;

(c) distilling the linear pentenes and the iso- and normal pentane upwardly in the first distillation column reactor, removing the linear pentenes and the iso- and normal pentane from an upper part of the first distillation column reactor, and removing the ether from a lower part of the first distillation column reactor;

(d) feeding the ether, removed from the first distillation column reactor to a feed zone of the second distillation column reactor, and decomposing the ether in the second distillation column reactor to obtain the tertiary pentenes and said alcohol;

(e) distilling the tertiary pentenes upwardly in the second distillation column reactor and withdrawing the tertiary pentenes from an upper part of the second distillation column reactor;

(f) feeding the linear pentenes and the iso- and normal pentane, removed from the upper part of the first distillation column reactor, to a feed zone of the third distillation column reactor, and also feeding an organic acid to the third distillation column reactor;

(g) reacting said organic acid with the linear pentenes in the third distillation column reactor to form an ester;

(h) fractionating the ester downwardly from the iso- and normal pentane in the third distillation column reactor and removing the ester from a lower part of the third distillation column reactor;

(i) feeding the ester, removed from the third distillation column reactor, to a feed zone of a fourth distillation column reactor;

(j) decomposing the ester in the fourth distillation column reactor to obtain said organic acid in the linear pentenes; and (k) fractionating the linear pentenes from the organic acid in the fourth distillation column reactor and withdrawing the linear pentenes from a fourth distillation column reactor.

4. A process in accordance with claim 3 wherein said alcohol is withdrawn from a lower part of the second distillation column reactor and is recycled as feed to the first distillation column reactor;

and wherein said organic acid is withdrawn from a lower part of the fourth distillation column reactor and is recycled as feed to the third distillation column reactor.

References Cited

UNITED STATES PATENTS

| | | | |
|---|---|---|---|
| 2,542,520 | 2/1951 | Hibshman | 183—115 |
| 3,250,820 | 5/1966 | Duthie | 260—677 |
| 3,260,057 | 7/1966 | Becker et al. | 62—17 |
| 3,094,571 | 6/1963 | Wilson, Jr. et al. | 260—681.5 |
| 3,059,037 | 10/1962 | Cahn | 260—674 |
| 3,366,457 | 1/1968 | Hunter | 23—263 |
| 3,241,926 | 3/1966 | Parker et al. | 23—283 |
| 1,968,601 | 7/1934 | Edlund | 260—151 |
| 2,392,740 | 1/1946 | Horeczy et al. | 2 60—677 |
| 2,370,810 | 3/1945 | Morrell et al. | 260—677 |

DELBERT E. GANTZ, Primary Examiner

J. M. NELSON, Assistant Examiner

U.S. Cl. X.R.

203—28